(12) United States Patent
Mercier

(10) Patent No.: US 7,861,674 B2
(45) Date of Patent: Jan. 4, 2011

(54) PET PORCH

(76) Inventor: William W. Mercier, 59 Rosedale St., #3, Lewiston, ME (US) 04240

( * ) Notice: Subject to any disclaimer, the term of this patent is extended or adjusted under 35 U.S.C. 154(b) by 222 days.

(21) Appl. No.: 12/229,357

(22) Filed: Aug. 23, 2008

(65) Prior Publication Data

US 2010/0043719 A1    Feb. 25, 2010

(51) Int. Cl.
*A01K 1/035* (2006.01)
(52) U.S. Cl. ..................................... 119/484
(58) Field of Classification Search ............... 119/484, 119/482, 500, 501; 312/307, 138.1, 139.2, 312/109, 350; 49/41, 40
See application file for complete search history.

(56) References Cited

U.S. PATENT DOCUMENTS

| 242,059 | A | * | 5/1881 | Scott | 52/201 |
| 459,216 | A | * | 9/1891 | Sumner | 119/453 |
| 1,326,718 | A | * | 12/1919 | Finn | 49/109 |
| 1,460,945 | A | * | 7/1923 | Chaplin | 119/484 |
| 2,522,391 | A | * | 9/1950 | McGonigle | 119/453 |
| 5,890,455 | A | * | 4/1999 | Donchey | 119/484 |
| 2005/0161000 | A1 | * | 7/2005 | Noyes | 119/484 |
| 2006/0277829 | A1 | * | 12/2006 | Kiefer | 49/40 |

* cited by examiner

*Primary Examiner*—Rob Swiatek
*Assistant Examiner*—Ebony Evans
(74) *Attorney, Agent, or Firm*—Nils Peter Mickelson

(57) ABSTRACT

A pet porch for placement in a casement or conventional double-hung window, allowing an indoor pet to access the outdoors safely. The porch has adjustable windows that can be set in a variety of positions for ventilation, yet closed when necessary. Closure can be effected by remote command, so that absentee owners can be sure the porch is closed for bad weather.

8 Claims, 5 Drawing Sheets

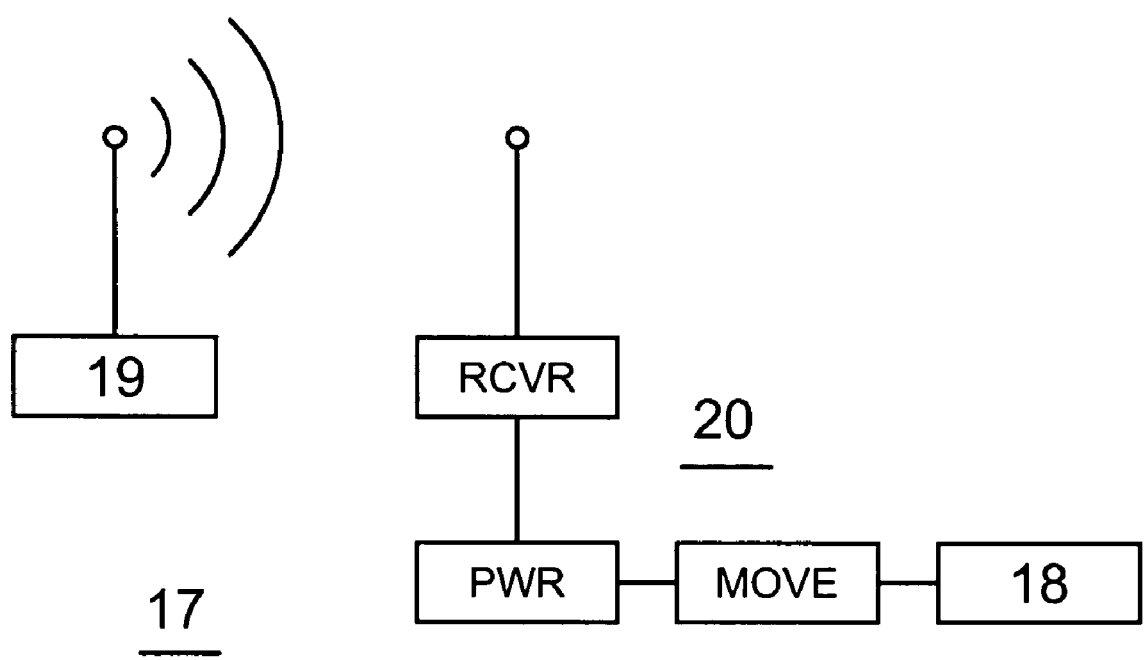

PET PORCH

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

This invention is in the field of pet accessories and enclosures, particularly such enclosures as may be mounted in a home's window or window frame.

BACKGROUND OF THE INVENTION

Household pets, such as cats or dogs, may be expected to live much or all of their lives indoors, in spite of their heritage as outdoor creatures. Pet owners often attempt to provide their pets with connections to the outside world by, for example, taking them outside on a walk or by giving them access to a window or door with a sight to the outdoors. For a cat, particularly, in an urban setting, access to a window may be its entire view of the outside world. Most pets, however, feel better when they can exercise not only their eyes, but also their acute senses of smell and hearing, as might be accomplished by access to a screened door or window. There are known enclosures which may be mounted in a window or door frame to allow the pet to be safely outside the building, where it can obtain a more complete outdoor experience, and some of these provide open screening. U.S. Pat. No. 4,445,459 to Julie, U.S. Pat. No. 4,989,546 to Cannaday, U.S. Pat. No. 5,148,767 to Torchio, and U.S. Pat. No. 5,167,202 to Bradford are exemplary. U.S. design Pat. D 549,401, issued to the present inventor and hereby incorporated in its entirety within this application, discloses a distinctly different construction from these, as does also design Pat. D 561,955 to Mc Donough. Each of these, however, suffers from a need for adjustable ventilation and other desirable improvements.

BRIEF SUMMARY OF THE INVENTION

One object of this invention is to overcome known shortcomings in the prior art by providing sliding windows, which may be conveniently moved so as to close the screening in case of inclement weather, or moved to afford cross-ventilation or directed ventilation. A further object is to provide automatic means for closing the windows without manual intervention, as may be desired when the weather changes and the pet owner is not at home.

To accomplish these objectives, the invention is constructed with curved transparent windows, movable by sliding along curved guide tracks from positions that completely cover the screened opening to alternate positions that create openings for ventilation. These curved windows provide the pet an unobstructed panoramic view and offer the invention a sleek, compact appearance while also presenting a more streamlined shape to strong side-winds.

In order to effect a device of this type, in its simplest form, it is beneficial to have the sliding windows accessible from indoors and thus mounted inside of the screening. Therefore, the invention, in its preferred embodiment, has screening on the outside and two curved sliding windows guided by parallel closely-spaced tracks, such that the windows can slide past one another in close proximity to effectively seal against the weather.

In such a sliding configuration, it becomes important to precisely maintain the distance between the top and bottom tracks to avoid jamming the windows. To effect the design shown in D 549,401, where two rounded top and bottom plates are illustrated, this spacing would be difficult to maintain without at least one upright spacer bar mounted between the two plates. Without such a bar, the spacing would rely entirely on the material rigidity of the plates and of the cantilever joints where they fasten to the end wall of the device. D 549,401 implies two such bars.

In a preferred embodiment, the pet's view can remain unobstructed of bars by extending the top and bottom plates beyond their curved front portion to create not only a larger inside compartment for the pet, but also to accept a pair of sidewalls that can act to greatly strengthen the rigidity of connection between the top and bottom plates. By using sidewalls whose width is a substantial portion of the front's curved radius, say one-half or more, it becomes practical to eliminate the upright bars entirely. It also becomes possible to retract each window panel farther into the larger compartment formed by the sidewalls, and thus provide a greater frontal opening for ventilation.

Moreover, it may prove beneficial to equip the top plate with a sloping roof surface to deflect and prevent rain from pooling on the top plate. It may also be an advantage to extend such a surface outward beyond the top plate, to form an eave and thus add rain and sun protection for the pet, and to construct at the top edge of this roof surface an additional upright lip to deflect spatter away from the building. Such a roof surface could be provided as an accessory or as a fixed component.

Mounting a pet porch in a window frame, especially on an upper floor level, commands attention to how the owner inserts and removes it. Such installation may occur seasonally, depending on climate and weather conditions. In this preferred embodiment, the extended compartment formed by the two sidewalls creates a section that will remain inside the window, not only providing a substantial indoor portion to be held and manipulated, but also adding a counterweighing mass to help balance the device on the windowsill and thus relieve some of the outward force borne by the window sash alone. A preferred embodiment would include a handle that can be fastened to the top surface to help the owner prevent the porch from falling out the window during installation or removal. Such a handle could be provided as a separate component, protruding or recessed, or as a shaped hole in the ceiling panel. Mounting such a device in a conventional double-hung window, whose lower window pane slides up to open, is straightforward using cleats or other means similar to those used for many years in window-hung air-conditioning units, and similar adjustable side panels to accommodate differing window widths. However sideward opening casement windows, where the entire window pane rotates outward, pose a different problem.

One solution is to entirely remove the rotating window sash assembly and install the pet porch on the windowsill while supporting its upper cleat by using a horizontal brace to substitute for a conventional window's sash and by adding a custom-fitted window pane to close the remaining opening above the brace. These additional parts can be provided the homeowner as accessories, or can be included partially in the product design itself as means for adapting to casement windows. Indeed, the entire device may be shipped to and constructed by the homeowner from a kit of parts, to save shipping and assembly costs.

A further consideration in any such device is the fact that weather may change during a time when the pet owner is not at home, leaving the sliding windows open to wind-driven rain or snow. Thus, it becomes beneficial to provide the sliding windows with an automated closure mechanism that can be activated by a remote command. This command could originate from the pet owner via some communications link such as radio, telephone, light beam or the Internet or it could be generated by a thermostat or a rain detector of the kind commonly used in automobiles to activate their windshield wipers.

BRIEF DESCRIPTION OF THE SEVERAL VIEWS OF THE DRAWINGS

FIG. 5 depicts a schematic diagram of one embodiment of a control means for automated closure.

REFERENCE NUMERALS USED IN THE DRAWINGS

| | |
|---|---|
| 1 | floor panel |
| 2 | ceiling panel |
| 3 | side wall |
| 4 | end wall |
| 5 | window |
| 6 | window knob |
| 7 | spacer bar |
| 8 | top cleat |
| 9 | bottom cleat |
| 10 | screening means |
| 11 | guide track |
| 12 | edging |
| 13 | sloping roof |
| 14 | upright lip |
| 15 | installation handle |
| 16 | entrance door |
| 17 | control means |
| 18 | actuator |
| 19 | initiator |
| 20 | control circuit |
| 21 | horizontal brace |

DESCRIPTION OF THE INVENTION

Figure 1:
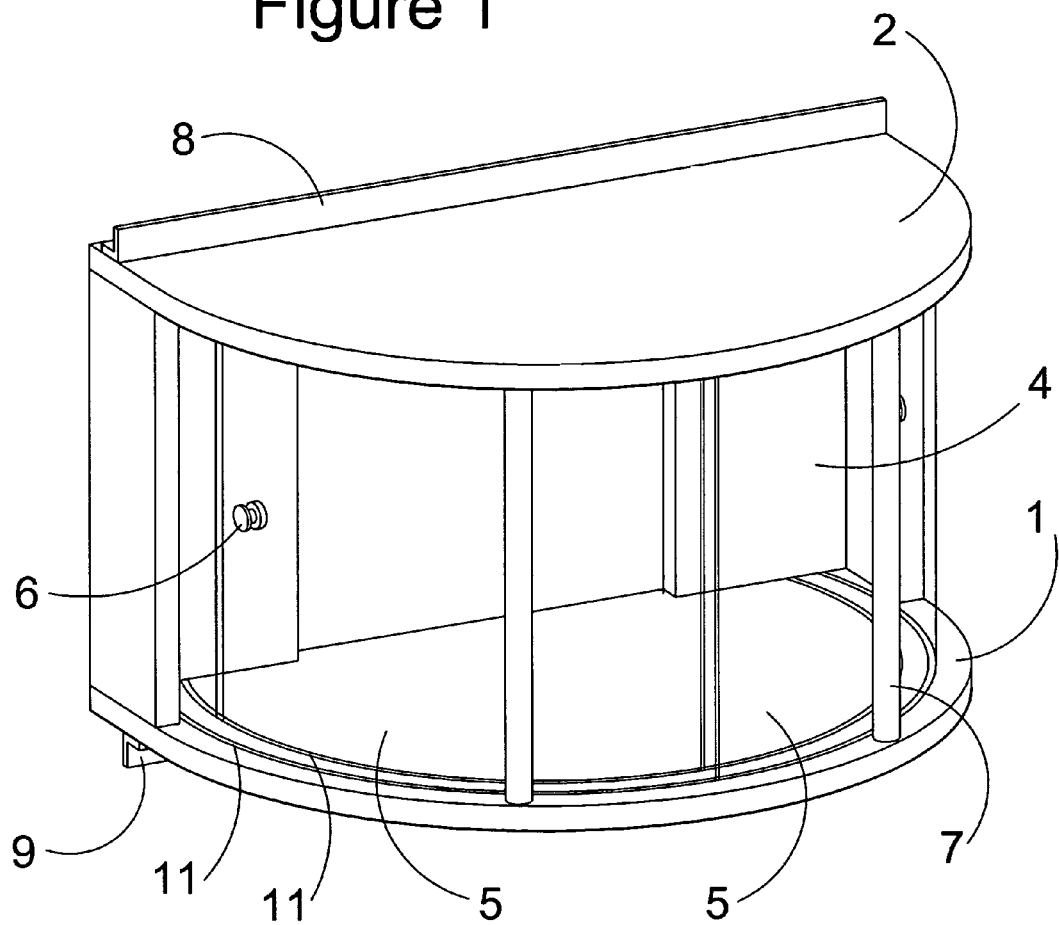
FIG. 1 shows a perspective frontal view, from the outdoors, of one embodiment of the invention, using spacer bars.
Figure 2:
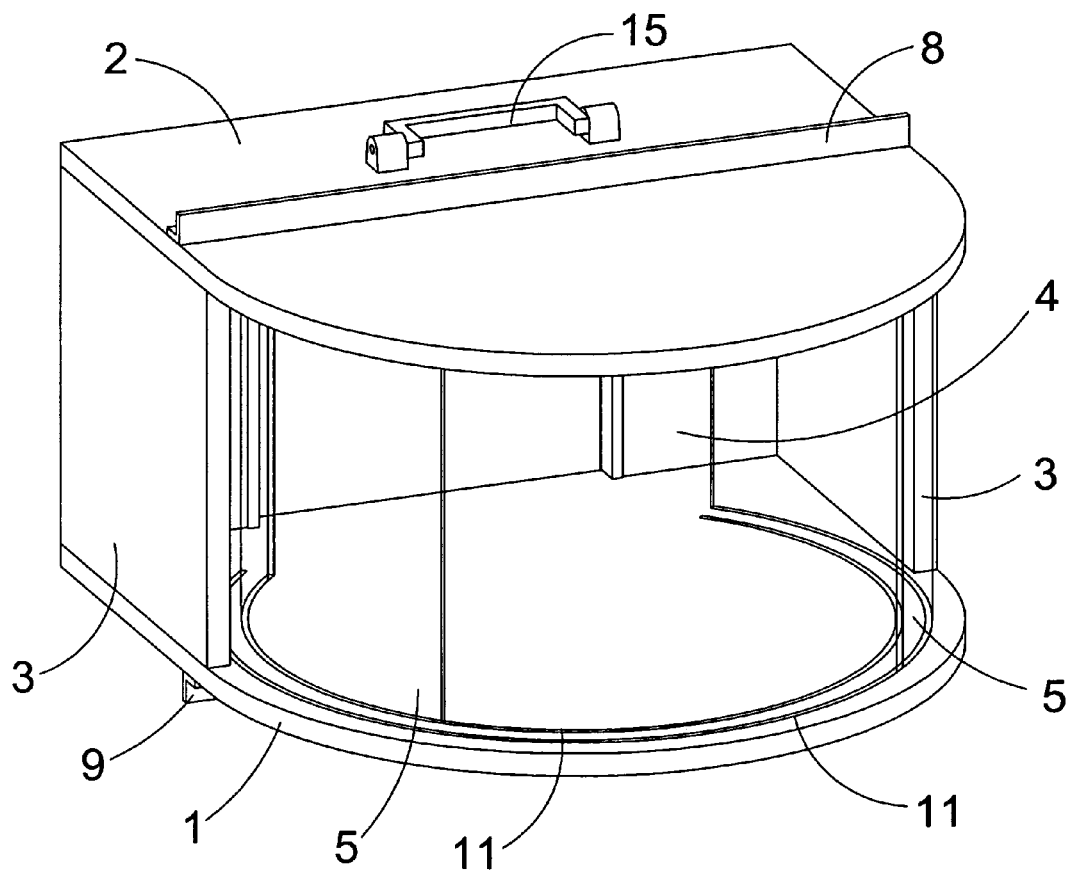
FIG. 2 shows a perspective frontal view of embodiment, not using spacer bars.

The pet porch, as illustrated at FIG. 1 in its simplest embodiment, shows it's floor panel 1, ceiling panel 2, two optional side walls 3, and it's end wall 4 outfitted with an entrance doorway 16. These walls and panels thus define the enclosure of the porch. Shown also are two curved sliding windows 5, movable along guide tracks 11 from their closed position (as shown in FIG. 1) to other positions along the track, as illustrated in FIG. 2. Window knobs 6 are shown, fastened to the inside rear end of each window 5, where a person inside the house can adjust windows 5 by access through the end wall 4 at the entrance doorway 16. Not shown, for simplicity, are weather sealing means disposed along the edge gaps of the two windows 5 and between the windows 5 and the enclosure to minimize weather exchange between the indoor and outdoor environments.

In its elemental embodiment, side walls 3 may optionally be omitted by incorporating sufficient material rigidity into the structural combination of ceiling and floor panels 2, 1 with end wall 4, or by devising a guide track and window combination that itself intrinsically maintains spacing and parallelism between panels 1 and 2, or even more simply by fastening at least one spacer bar 7 between floor panel 1 and ceiling panel 2.

In a preferred embodiment, however, side walls 3 may be made of such a proportion that they alone can maintain the spacing between panels 1 and 2. In such case, shown in FIG. 2, the widths of side walls 3 must be sufficient, and thus preferably about half the radius or more of the overhanging curved portions of panels 1 and 2. The advantage of using side walls lies not only in eliminating spacer bars 7, which obstruct the pet's line of sight, but also in extending the interior size of the enclosure so the pet will have more room for comfort, and can move back into a shaded place to avoid strong sun.

Top and bottom cleats 8 and 9 are provided as a means to support the pet porch in a window opening. Floor panel 1 would typically rest directly on a windowsill, whose sash is raised to a fully open position. Bottom cleat 9 would be positioned against the outer edge of the windowsill, occupying the space where the sash was when closed. Thus placed, and particularly with the weight of a pet inside, the pet porch would tend to roll outward over the windowsill. Top cleat 8 is placed such that it can bear against the inner edge of the window sash when properly lowered to close against ceiling panel 2. Thus, the tendency to roll outwards is resisted by the sash, and the pet porch is firmly secured. It may be preferred to offset top cleat 8 slightly inward, such that the entire pet porch is canted slightly downward at its outer edges to provide drainage in heavy, driving rain.

Where the home is equipped with casement-style windows, which rotate outward yet continue to obstruct the window opening, the entire movable sash can usually be readily removed from its frame, but then there is no conventional sash to lower onto the pet porch. In this case, a horizontal brace 21 can be constructed that fits between the upright sides of the frame and serves the same function of obstructing outward rotation of the top cleat 8. Once the pet porch is installed, in either type of window, there will likely remain open areas around the porch, which can be sealed in any number of ways, similarly to a window-mounted air conditioner. Pleated adjustable panels serve this purpose well, at the sides, to fill any gap between the porch and a yet wider window opening, and rectangular panels, transparent or opaque, can fill the open area above the horizontal brace 21.

Figure 3:
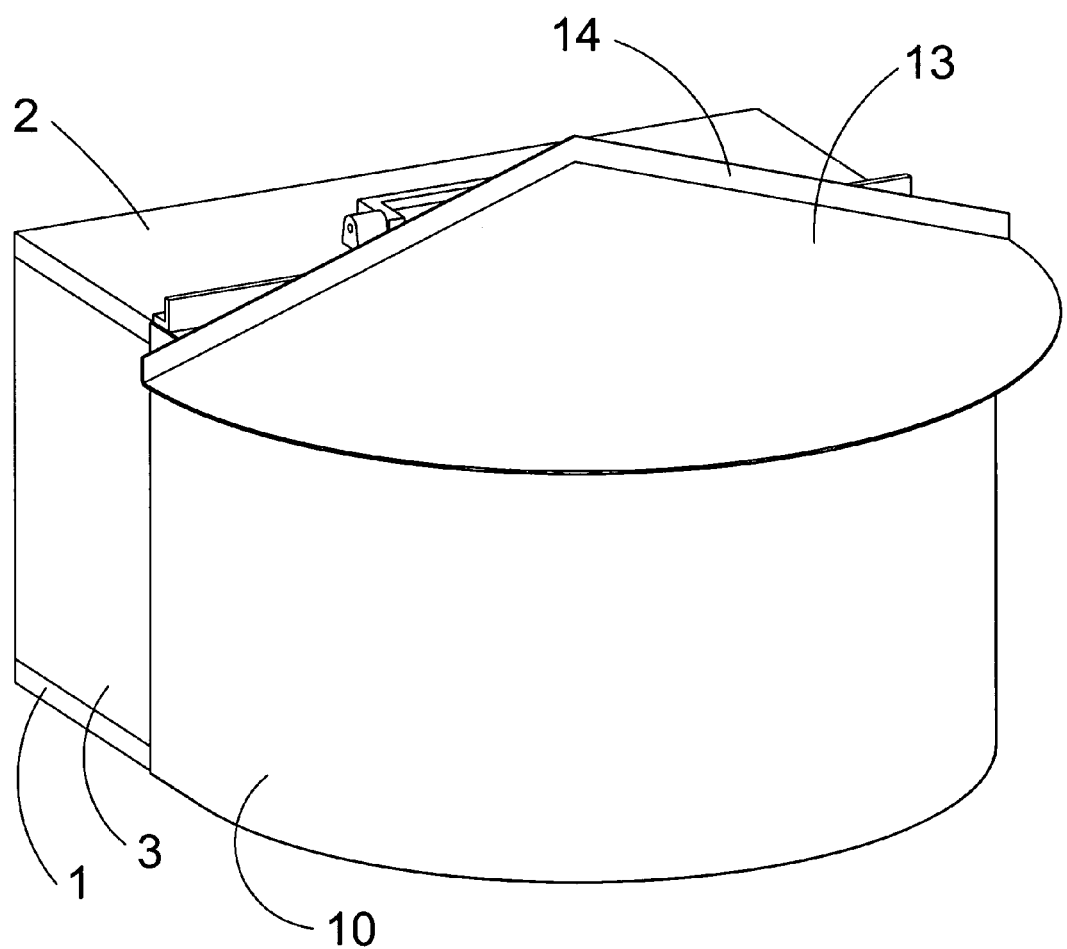
FIG. 3 shows a perspective frontal view of the invention equipped with a screen and a sloped roof.

It may be observed that, when the pet porch is properly installed, ceiling panel 2 extends outward from the window frame into the outdoor environment where falling rain strikes it directly. Even with the slight downward drainage angle provided by the offset cleats eight and nine, there will be a strong tendency for water to accumulate on the top surface, which may cause leakage into the house around the ends of top cleat 8 and which will certainly tend to be directed by surface tension to cascade into the porch's enclosure. Thus, it is desired to provide an optional sloping roof structure 13, as shown in FIG. 3 to cope with heavy rains in locales where they occur. In providing such a sloping roof 13, it is advantageous to extend its lower edge outward beyond the periphery of ceiling panel 2 to protect it from water that would otherwise be directed inward, and to extend it yet further to provide added protection for floor panel 1 and for the pet inside the enclosure in case of slanting rain. Additionally, because fast-moving liquid rain, striking the solid surface of sloping roof 13, will convert its downward momentum into high-velocity sideways momentum, it is advantageous to provide along the upper edge of sloping roof 13 an upright lip 14 to deflect such spattering away from the house and the window frame.

Furthermore, when the windows 5 are open, there will be the possibility for the pet to fall out and for insects to fly in. To prevent this, a screening means 10 must be provided for screening the opening. As shown in FIG. 3, there are many ways to accomplish this screening means 10, by using closely-spaced vertical cage bars or so-called chain-link metal fencing or expanded-metal sheeting, each overlaid by mosquito-proof screening, or by using transparent or opaque sheathing with screened apertures cut through it, or using metal mosquito screen bonded to or insert-molded into a polymeric plastic frame, or any of many other suitable constructs.

Figure 4:
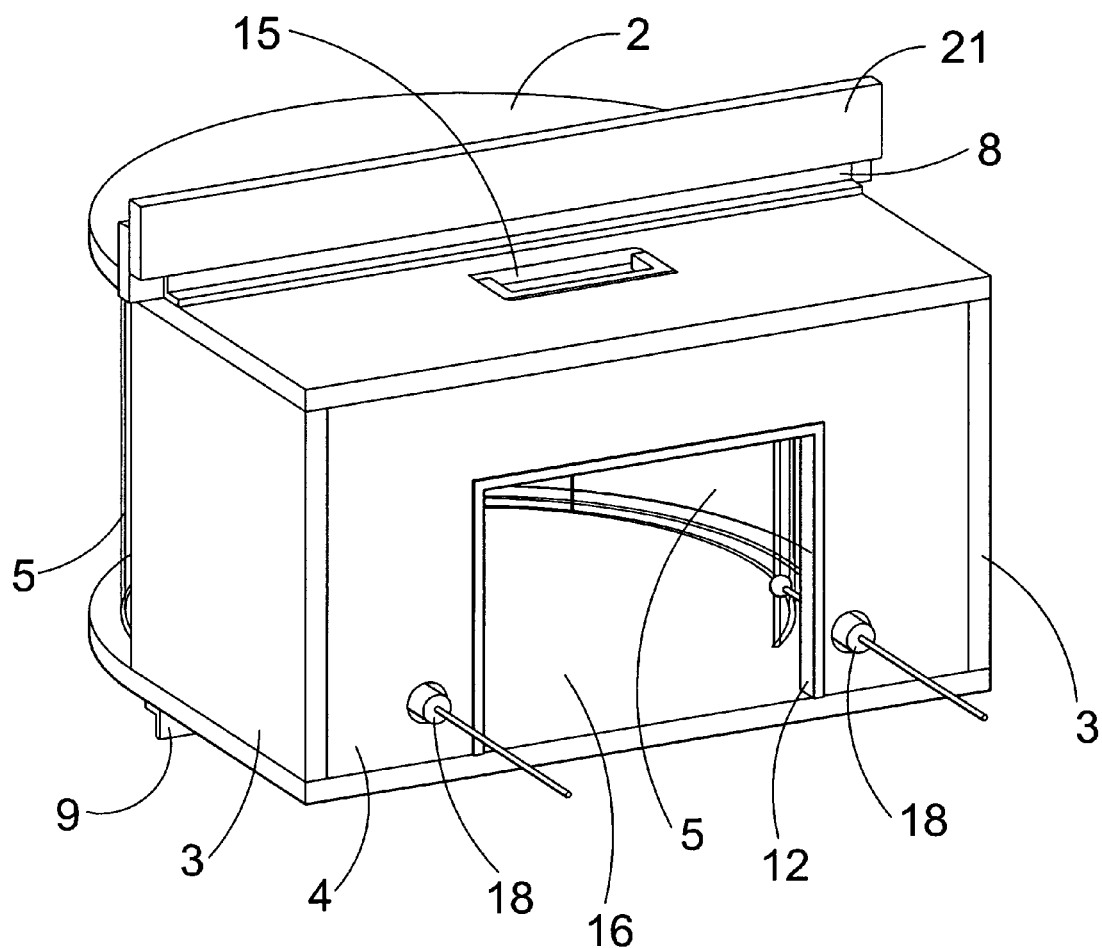
FIG. 4 shows a prospective rear view, from indoors, of the invention equipped with automated closure means.

And finally, it would be advantageous to provide a control means 17 for closing the sliding windows 5 from their open positions in the case where the pet owner has left home and the weather turns bad. This control means 17 can be provided in many ways, but for purposes of illustration, as shown in FIGS. 4 and 5, remote actuation of the windows can be detected by equipping them each with an actuator 18 that is operated by a control circuit 20. This control circuit 20 would provide power for actuation and also generate control information for placement (as in the use of a stepping motor or a servo motor), and would respond to a signal that could emanate from a thermostat, or from a rain sensor, or even from a hand-held remote control unit.

In the case shown, where the windows 5 are guided by circular tracks 11, the windows 5 may be constructed of essentially rigid material such as glass or acrylic resin. Here, the actuators 18 may need to be provided with flexible mounting and ball-joint attachment to the window's 5 edge. In another case, using essentially flexible window material such as vinyl, the guide tracks 11 could become straightened, paralleling side wall 3, and then directly-fastened linear actuators 18 could serve the purpose without such flexibility.

Other actuating means, including manual operation using window knobs 6, allow the windows 5 to both be moved to the same side of the enclosure for directing wind either into or out of the building, or both be moved to the front to allow cross-ventilation.

For installation in a conventional window, the window sash would be raised, the pet porch lifted into position with bottom cleat 9 placed outside the windowsill, while the porch is prevented from rolling out the window by tension on installation handle 15, and the sash would be lowered outside of top cleats 8 against ceiling panel 2, and behind sloping roof 13 if so equipped. Appropriate sealing means would be installed to fill any gaps remaining around the porch.

A pet inside the building could, at its own volition, enter or leave the porch through entrance doorway 16 in end wall 4. Entrance doorway 16 could be provided with protective edging 12, to protect the pet from sharp edges and to protect the porch from wear damage after extended use. Ceiling panel 2 would provide sun and rain protection for the pet, and screening means 10 would contain the pet while also precluding insects.

Sloping roof 13, if installed, would extend shade and provide extra rain protection for the pet.

Equipped with automated closure, the unattended pet porch would be closed if outside temperature reached excessive values or if precipitation were detected, or if a remote signal were received from the owner, as by a telephone call or other communication means. Signals from such an initiator 19, received by control circuit 20, would be interpreted into appropriate drive commands and sent on to actuators 18 to move windows 5 to their respective closed positions.

From the foregoing description, it should be understood that this invention can be effected in several ways, and that it provides distinct and desirable advantages over the existing art. For example, it would be possible to provide pet-initiated commands to the actuators, or to add an actuator for turning on and off a water supply. It would be feasible to provide a variety of screening means, each suited to different pets or environmental conditions. The invention can best be understood from its claims.

I claim:

1. An improved pet porch for mounting in a window of a building, comprising
   a. a floor panel and a ceiling panel, each having both an inner and an outer surface, a back edge and a curved front edge opposite from said back edge;
   b. an end wall extending between and rigidly fastened to each of said floor and ceiling panels along said respective back edges to rigidly hold said ceiling panel above and in parallel spaced alignment with said floor panel, said end wall having an entrance doorway;
   c. opposing side walls disposed between and fastened to said floor and ceiling panels and to said end wall;
   d. guide tracks formed substantially parallel to said curved front edges and along each said inner surface of said floor and ceiling panels;
   e. at least one window constrained by and between said guide tracks so as to slide along said guide tracks from a closed position to an open position;
   f. screening means fixedly disposed between and along each said curved front edge of said floor and ceiling panels to exclude insects;
   said screening means forming a ventilated wall to contain a pet, said entrance doorway allowing said pet to pass freely between said pet porch and said building's interior, and said window permitting adjustment of ventilation into or through said pet porch, and said side walls substantially extending the interior size of said pet porch and affording greater range of motion for said sliding window within said porch.

2. The improved pet porch of claim 1 further comprising at least one upright bar extending between and fastened to each of said floor and ceiling panels, said bar maintaining spacing therebetween in circumstances where such spacing is not otherwise adequately provided.

3. The improved pet porch of claim 1 wherein each said window is equipped with a means for facilitating movement by hand.

4. The improved pet porch of claim 1 further comprising handle means adapted to facilitate installation and removal of said pet porch in a window of a building, said handle means placed to remain inside and accessible within said building's interior when said pet porch is fully installed.

5. The improved pet porch of claim 1 further comprising a horizontal brace adapted for mounting said pet porch in a casement-type window wherein no sliding upper sash exists to support said porch.

6. The improved pet porch of claim 1 further comprising remote actuating means for automatically moving said window through and into a range of positions from and including fully open and fully closed positions to adjust ventilation between the outdoors environment, the pet porch interior and the interior of said building.

7. The improved pet porch of claim 1 further comprising a sloping roof means for deflecting and preventing accumulation of precipitation upon said outer surface of said ceiling panel, said sloping roof comprising both an upper and a lower edge, and extending substantially over and beyond the entire exposed upper surface of said pet porch when installed.

8. The improved pet porch of claim 7 wherein said sloping roof means further comprises an upright lip along said upper edge to deflect spatter from said building.

* * * * *